US007734497B2

(12) United States Patent
Kelley et al.

(10) Patent No.: US 7,734,497 B2
(45) Date of Patent: Jun. 8, 2010

(54) METHOD, SYSTEM, AND STORAGE MEDIUM FOR IMPLEMENTING TRANSACTION-BASED DATA EXCHANGE

(75) Inventors: Edward E. Kelley, Wappingers Falls, NY (US); Tijs I. Wilbrink, Voorburg (NL); John H. Bickford, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 1099 days.

(21) Appl. No.: 10/906,525

(22) Filed: Feb. 23, 2005

(65) Prior Publication Data
US 2006/0190273 A1 Aug. 24, 2006

(51) Int. Cl.
G06F 17/30 (2006.01)
G06F 17/00 (2006.01)

(52) U.S. Cl. .................................... 705/10; 705/400
(58) Field of Classification Search .................. 705/1, 705/26, 27, 7, 10, 11, 14, 20, 21, 22, 28, 705/29, 30–34, 400, 37, 36 R
See application file for complete search history.

(56) References Cited

U.S. PATENT DOCUMENTS

| 6,025,780 | A | 2/2000 | Bowers et al. |
| 6,169,483 | B1 | 1/2001 | Ghaffari et al. |
| 6,266,652 | B1* | 7/2001 | Godin et al. .................. 705/37 |
| 6,317,028 | B1 | 11/2001 | Valiulis |
| 6,327,576 | B1* | 12/2001 | Ogasawara .................. 705/22 |
| 6,502,080 | B1* | 12/2002 | Eichorst et al. ............. 705/400 |
| 6,965,867 | B1* | 11/2005 | Jameson ........................ 705/8 |
| 7,366,679 | B2* | 4/2008 | Yuyama et al. ............... 705/10 |
| 7,546,265 | B1* | 6/2009 | Donner ..................... 705/36 R |
| 2001/0009005 | A1* | 7/2001 | Godin et al. .................. 705/37 |
| 2001/0023402 | A1* | 9/2001 | Flynn ............................. 705/1 |
| 2001/0034609 | A1* | 10/2001 | Dovolis ......................... 705/1 |
| 2001/0037248 | A1* | 11/2001 | Klein .......................... 705/22 |
| 2002/0065680 | A1 | 5/2002 | Kojima et al. |
| 2002/0082859 | A1 | 6/2002 | Lancos et al. |
| 2002/0165743 | A1* | 11/2002 | Dahl-Sorensen et al. ....... 705/7 |
| 2003/0061104 | A1* | 3/2003 | Thomson et al. ............. 705/26 |
| 2003/0126047 | A1* | 7/2003 | Hollar et al. ................. 705/30 |
| 2004/0177004 | A1* | 9/2004 | Mueller et al. ............... 705/15 |

FOREIGN PATENT DOCUMENTS

WO WO 01/18732 A2 3/2001

OTHER PUBLICATIONS

McGinity, Meg, "RFID: Is This a Game of Tag Fair Play?", Communications of the ACM, Jan. 2004, vol. 47, No. 1, pp. 15-18.

(Continued)

Primary Examiner—Igor Borissov
(74) Attorney, Agent, or Firm—Cantor Colburn LLP; Ronald Kaschak

(57) ABSTRACT

A method for implementing transaction-based data exchange. The method includes transferring information relating to a product via a transmission means selected by an individual at a computing device requesting the information. The information includes at least one of warranty information, accounting information, pricing information, and product details. The method further includes calculating a net worth relating to the product, and updating a financial application associated with the individual with results of the calculating.

51 Claims, 16 Drawing Sheets

OTHER PUBLICATIONS

Chlamtac, Imrich et al., "Energy-Conserving Access Protocols for Identification Networks", IEEE/ACM Transactions on Networking, vol. 7, No. 1, Feb. 1999, pp. 51-59.

Beigel, Michael L., "Dynamic Performance of Inductive RFID Systems," Proceedings of the European Conference on Circuit Theory and Design, ECCTD 99, Stresa, Italy, Aug. 29-Sep. 2, 1999, vol. 1, pp. 29-33.

Juels, A. et al. "The Blocker Tag: Selective Blocking of RFID Tags for Consumer Privacy", CCS'03, Oct. 27-31, 2003, Washington, D.C., pp. 103-111.

* cited by examiner

| STORE | ITEM | DOCUMENTS | PRICE | STORE/OTHER CERTIFICATE | STILL OWNED? |
|---|---|---|---|---|---|
| | | | | | |
| ABC COMPANY | IBM THINKPAD | USER MANUAL; WARRANTY; ACCOUNTING INSTRUCTIONS/TIPS | $5,000 | YES, +ID | YES |
| XYZ COMPANY | ... | ... | | | |

FIG. 3

| COUNTRY | ITEM | PRICE | DEPRECIATION | ... |
|---|---|---|---|---|
| | | | | |
| NETHERLANDS | IBM THINKPAD | $5,000 | SPREAD OVER 3 YEARS | |
| USA | ... | ... | ... | |

FIG. 5

| STORE | DISCOUNT | VALID THROUGH... | CRITERIA | ... |
|---|---|---|---|---|
|  |  |  |  |  |
| ABC COMPANY | 10% | DECEMBER 2004 | COMPUTERS; PRODUCT IDs; ETC |  |
| XYZ COMPANY | ... | ... |  |  |

FIG. 8

METHOD, SYSTEM, AND STORAGE MEDIUM FOR IMPLEMENTING TRANSACTION-BASED DATA EXCHANGE

BACKGROUND OF THE INVENTION

The invention relates generally to data processing, and more particularly, to a method, system, and storage medium for implementing transaction-based data exchange.

Managing information can be a time consuming and often difficult task, particularly where large amounts of information are involved. Information can become outdated with the passage of time, change in response to new information or activities conducted, and may interrelate in important ways to other existing information in a manner that is undetected and unforeseen, causing it to be underutilized. One example is the purchase and sale of products. While a product purchased by an individual may be subject to a warranty, the validity of that warranty may be conditional upon the individual having the product serviced at specified time periods throughout the warranty period (e.g., a warranty for rust protectant applied to a new vehicle). The individual may keep records of payments made (e.g., per an installment contract), as well as the warranty paperwork, but unless the information concerning the warranty conditions is well organized and efficiently managed, the individual may neglect to service the product on time causing the warranty to become invalid.

A variety of useful information is available or accessible regarding purchases at the time of sale or pre-sale period. Product specifications, pricing, taxes, manufacturer warranty registration and rebates, and other data may be helpful to a purchaser in making purchasing decisions, as well as long-term decisions related to the purchase. Acquiring, organizing, and managing this information can be difficult and time-consuming, partly because the information is not centrally located but rather originates from various sources (e.g., manufacturer, seller, financial institutions, etc.). What is needed, therefore, is a way to acquire, organize, and maintain transaction-based information that is derived from a variety of disparate sources.

BRIEF SUMMARY OF THE INVENTION

Exemplary embodiments of the present invention include a method for implementing transaction-based data exchange. The method includes transferring information relating to a product via a transmission means selected by an individual at a computing device requesting the information. The information includes at least one of warranty information, accounting information, pricing information, and product details. The method further includes calculating a net worth relating to the product, and updating a financial application associated with the individual with results of the calculating.

Additional exemplary embodiments include a system for implementing transaction-based data exchange. The system includes a processor executing a data exchange system application and a link to at least one client system. The data exchange system application performs a method. The method includes transferring information relating to a product via a transmission means selected by an individual at the client device requesting the information. The information includes at least one of warranty information, accounting information, pricing information, and product details. The method further includes calculating a net worth relating to the product and updating a financial application associated with the client device with results of the calculating.

Further exemplary embodiments include a storage medium for implementing transaction-based data exchange. The storage medium is encoded with machine-readable program code. The program code includes instructions for performing a method. The method includes transferring information relating to a product via a transmission means selected by an individual at a computing device requesting the information. The information includes at least one of warranty information, accounting information, pricing information, and product details. The method further includes calculating a net worth relating to the product, and updating a financial application associated with the individual with results of the calculating.

BRIEF DESCRIPTION OF THE DRAWINGS

Referring now to the drawings wherein like elements are numbered alike in the several FIGURES:

FIG. 3 is a user interface screen illustrating sample product data managed by the data exchange system in exemplary embodiments;

FIG. 5 is a user interface screen illustrating sample accounting data managed by the data exchange system in exemplary embodiments;

FIG. 8 is a user interface screen illustrating sample net worth data managed by the data exchange system in exemplary embodiments;

DETAILED DESCRIPTION OF THE PREFERRED EMBODIMENTS

Exemplary embodiments of the present invention provide a variety of useful information regarding purchases at the point of sale or pre-sale period. Product specifications, pricing, taxes, manufacturer warranty registration and rebates, and other data are acquired from various sources such as manufacturing enterprises, selling entities, financial institutions, etc. Embodiments of the invention acquire, organize, and facilitate dissemination of this information on behalf of individual consumers and/or businesses. Accounting information, warranties, and net worth are some of the information that is managed by the invention. This information may be transferred to designated parties in several manners, including e.g., wireless transfer to a mobile computing device, via email, web access, etc.

Figure 1:
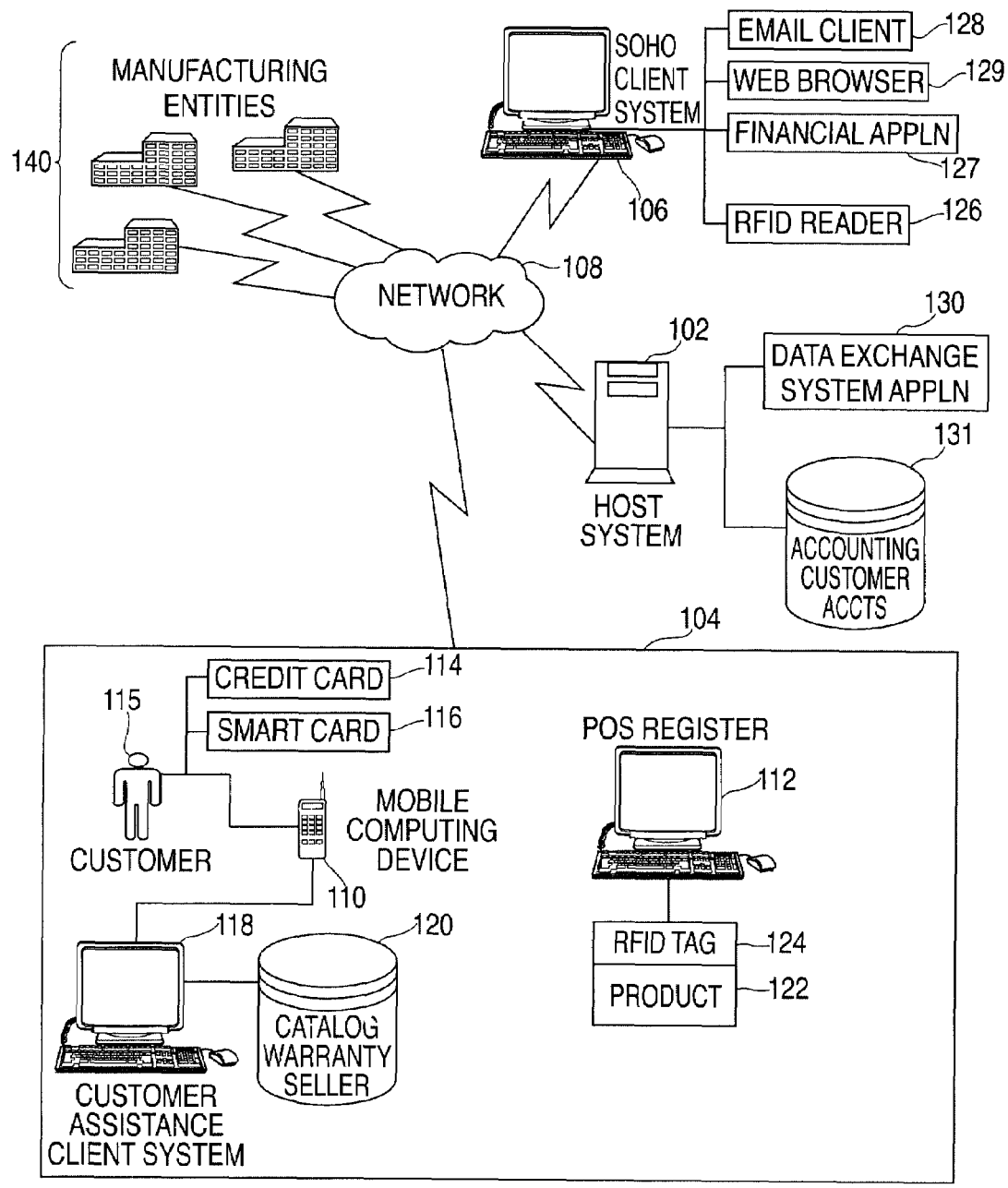
FIG. 1 depicts a system upon which a data exchange system may be implemented in exemplary embodiments.

Turning now to FIG. 1, an exemplary system upon which the data exchange processes may be implemented will now be described. The exemplary system 100 of FIG. 1 includes a host system 102, a selling entity 104, a small office/home office (SOHO) client system 106, and manufacturing entities 140, each of which may communicate with one another via one or more networks such as network 108.

Host system 102 may be a service provider that implements data exchange activities on behalf of entities such as one or more of manufacturing entities 140, selling entity 104, and SOHO client system 106 for a fee. The data exchange activities described herein may be implemented via an application 130 executing on host system 102. Host system 102 may implement one or more servers including a web server, applications server, and database management server for conducting the data exchange activities described herein. Host system 102 may be an application service provider (ASP), a financial institution (e.g., credit card company, bank), or other similar type of service provider. Host system 102 may be coupled to a data repository 131 that stores, e.g., accounting rules and customer account records as described further herein.

Manufacturing entities 140 refer to enterprises that produce and sell goods and/or services to purchasing entities. Manufacturing entities 140 may also provide information relating to their products/services, such as product specifications, product models, product images, suggested retail pricing, manufacturer rebate information, and manufacturer warranty information.

SOHO client system 106 refers to a computer device operated by an individual in furtherance of a business purpose or a home information management objective (e.g., home inventory, financial account/asset maintenance, etc.). SOHO client system 106 may comprise a general-purpose or laptop computer that executes one or more applications including, e.g., email client 128, web browser 129, financial accounting software 127, and other similar types of programs. In one embodiment, SOHO client 106 executes a Radio Frequency Identifier (RFID) reader 126 for scanning purchased products containing an RFID tag with data exchange information provided therein. This is described further herein.

In accordance with exemplary embodiments, selling entity 104 includes a point-of-sale register 112 and products (e.g., product 122). Point-of-sale register 112 may comprise a processor-enabled device that includes software for implementing purchase transactions conducted therein. Point-of-sale register 112 may also include memory for storing purchase transaction information. In one embodiment, point-of-sale register 112 includes an RFID reader (not shown) for scanning products purchased and retrieving pricing information, as well as data exchange information. Additionally, point-of-sale register 112 may be coupled to a network (e.g., network 108) for communicating with, e.g., host system 102, a credit company, customer assistance client system 118, a corporate office of selling entity 104, etc.

In one embodiment, selling entity 104 includes a customer assistance client system 118 coupled to a data repository 120. Client system 118 may be a general-purpose computer system operated by a front desk/customer service operator, or may be a freestanding, self-service kiosk available for use by customers. Client system 118 may include an application for searching and retrieving product information (including data exchange information) stored in data repository 120. Further, client system 118 may execute in whole, or in part, the data exchange system application 130. For example, if the client system 118 is a personal computer, the processing described herein may be shared by the client system 118 and host system 102 (e.g., by providing an applet to the client system 118).

In accordance with exemplary embodiments, data repository 120 stores product information in a product catalog including, e.g., product specifications, product identification information, pricing, warranty information, promotions and discounts, preferred customer pricing and service information, etc. relating to the goods sold by selling entity 104. While shown as separate devices, it will be understood by those skilled in the art that client system 118 and data repository 120 may comprise a single device, whereby information is stored in memory internal to client system 118. Alternatively, client system 118 may be in communication with multiple data repositories located in various geographic locations (including data repository 120), which store the information described above with respect to data repository 120.

Selling entity 104 displays a variety of products for sale as is typically found in a retail (or wholesale) establishment. Products, such as product 122 may include an RFID tag 124 which, when scanned by point-of-sale register 112, provides pricing information. In one embodiment, RFID tag 124 may store additional information relating to the product 122 such as manufacturer and/or store warranty information, discount information, manufacturer and/or store rebate information, etc.

A customer 115 is also shown in selling entity 104. Customer 115 may possess a credit card/check card 114 and/or a smart card 116. Customer 115 may also possess a mobile computing device 110 (e.g., personal digital assistant, handheld device, cell phone, etc.). One or more of credit card/check card 114, smart card 116, and mobile computing device 110 may be utilized in implementing the data exchange processes as described further herein. It is assumed for purposes of illustration that the customer 115 is also the operator of SOHO client system 106.

The network 108 may be any type of known network including, but not limited to, a wide area network (WAN), a local area network (LAN), a global network (e.g., Internet), a virtual private network (VPN), and an intranet. The network 108 may be implemented using a wireless network or any kind of physical network implementation known in the art. A user system (e.g., client system 106, client system 118, mobile computing device 110, point-of-sale register 112, manufacturing entities 140, etc.) may be coupled to the host system 102 through multiple networks (e.g., intranet and Internet) so that not all user systems are coupled to the host system 102 through the same network. One or more of the user systems described above and the host system 102 may be connected to the network 108 in a wireless fashion. In one embodiment, the network 108 is an intranet and one or more of the user systems execute a user interface application (e.g. a web browser) to contact the host system 102 through the network 108.

Figure 2:
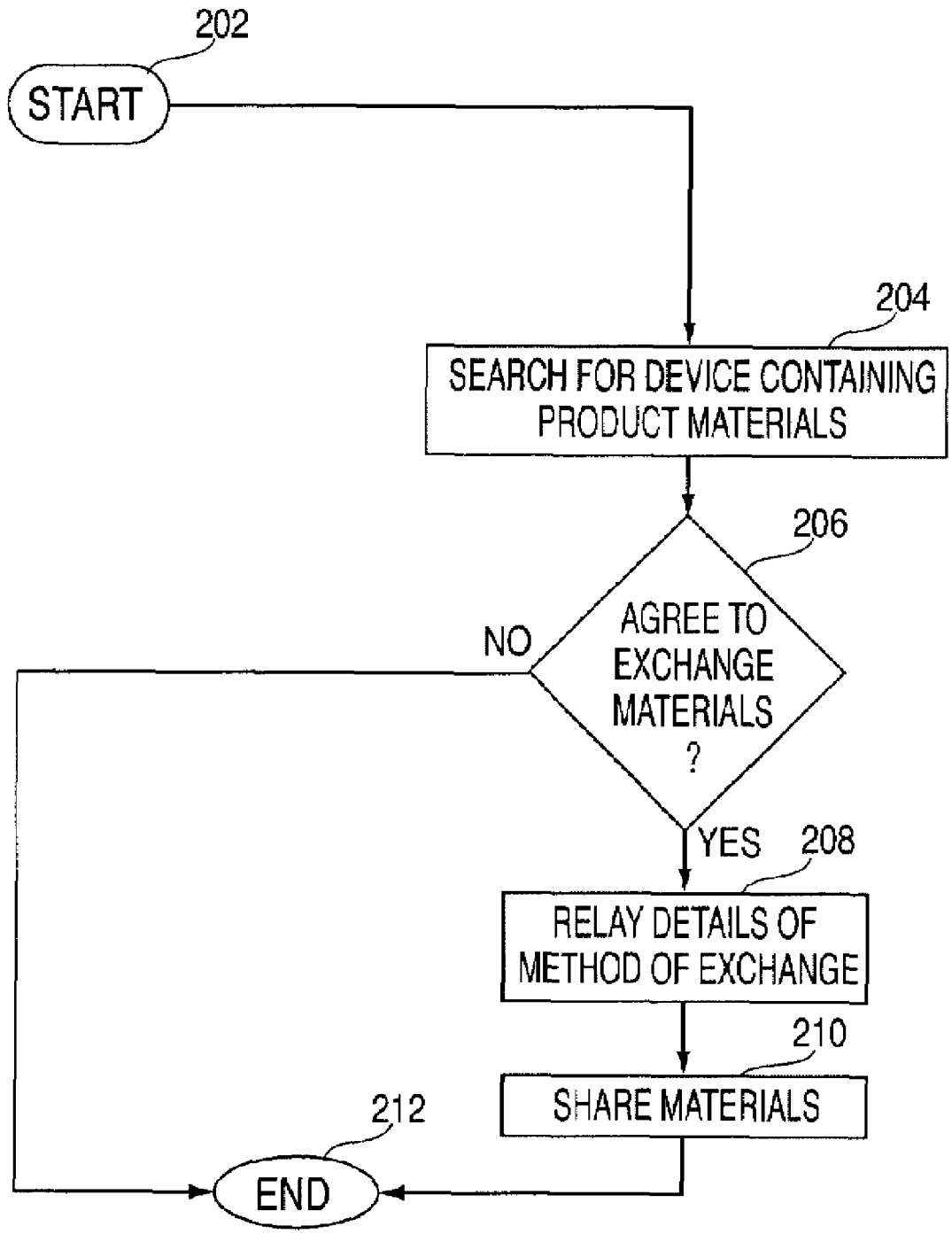
FIG. 2 is a flow diagram of a process for acquiring and managing product information for use in implementing the data exchange system in exemplary embodiments.

An exemplary embodiment for acquiring a variety of information from various sources is performed via the data exchange system as described in the flow diagram of FIG. 2. At step 202, the process is initiated by either customer 115 or selling entity 104. For instance, client system 118 may be available for searching and retrieving product information from a product catalog or database in data repository 120. A prospective customer (e.g., pre-sale customer) or current customer (post-sale customer) may access client system 118 to determine if data exchange services are available for a product of interest. A pre-sale customer may desire discount and rebate information for a product of interest in order to make an informed purchasing decision. A post-sale customer may desire more detailed information regarding the product of interest.

At step 204, a search for the product of interest is conducted. If data exchange activities are available for the product of interest, the customer 115 may request access to information available via the data exchange system. This step is described further in FIGS. 4, 6, and 7. Depending upon the type of information desired, the data exchange system may access one or more of data repository 120, host system 102, and manufacturing entities 140. Proof of product purchase may be required before enabling access to some of the information provided by the data exchange system at step 206. For example, if the customer is a post-sale customer, the data exchange system may automatically register the purchased product with a warranty provider such as selling entity 104 and/or manufacturing entity 140 using personal information provided by the customer 115 at the time of sale. If the customer 115 is not authorized to receive the requested information, the process ends at step 212.

Figure 4:
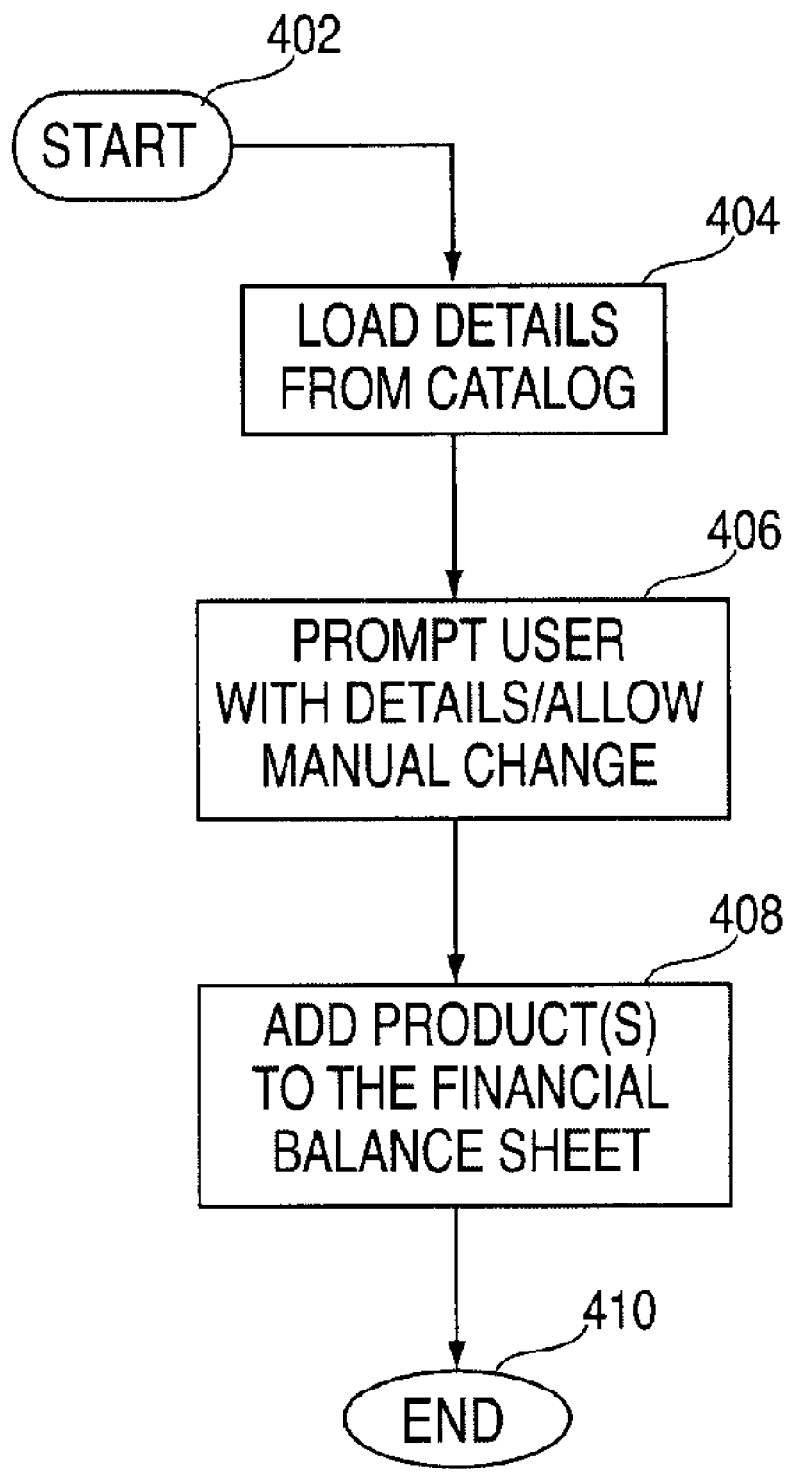
FIG. 4 is a flow diagram of a process for acquiring and managing accounting information via the data exchange system in exemplary embodiments.
Figure 6:
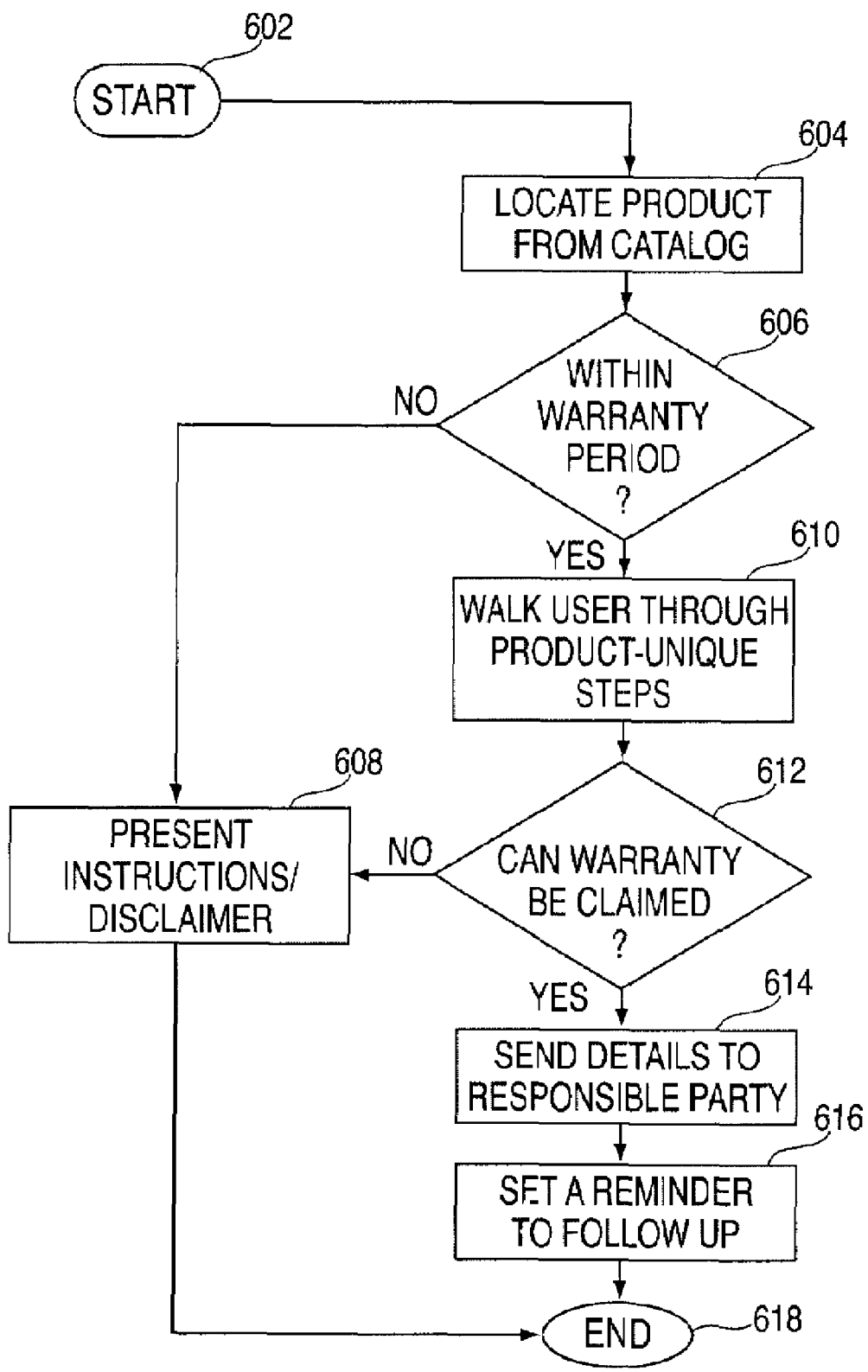
FIG. 6 is a flow diagram of a process for acquiring and managing warranty information via the data exchange system in exemplary embodiments.

Once the requested information is found and the customer 115 is authorized to receive it, the customer 115 may select a means of transferring the information at step 208. For example, the information may be transferred via the customer's mobile computing device 110 using wireless technology, e.g., Bluetooth™ or infrared. Alternatively, the information may be transmitted via email to the SOHO client system 118. The transfer of information may be immediate (e.g., while the customer 115 is on the premises of selling entity 104. The transfer may take place via the Internet (e.g., exchanging URLs with generic materials (e.g., a user manual) or via email. The processes described in FIGS. 4 and 6 provide additional details on the acquisition of accounting and warranty information, respectively.

At step 210, the information is provided to the customer 115. The information provided may include a unique identifier for identifying the product selected in other processes. Sample information provided to the customer 115 is shown generally in the table 300 of FIG. 3. In exemplary embodiments, the table 300 is broken down by store (or selling entity) in column 302. The product 122 (or item) associated with each store 104 is presented in column 304. The data exchange system lists each of the documents and information acquired for this product in column 306. The purchase price is listed in column 308. The STORE/OTHER CERTIFICATE column 310 may reflect a certified agreement with the store or intermediate organization that may be used to certify discount rates that apply to the customer. This agreement may include an identifier for present and ongoing reference to the agreement. Also, table 300 includes a column 312 for updating the status of the product (e.g., whether it is still owned by, and/or in the possession of, the customer). It will be appreciated that additional information (columns) may be provided and managed via the data exchange system.

As indicated above, accounting information may be acquired and organized via the data exchange system. Accounting information may include instructions for handling financial transactions and/or reporting. Accounting information may originate from government regulations and may apply to specific products and/or product categories (e.g., luxury tax on yachts). An exemplary process for acquiring and managing accounting information will now be described with respect to the flow diagram of FIG. 4. For purposes of illustration, it is assumed that the data exchange system is in communication with an accounting package or software 127 executing on SOHO client system 106. The process is initiated at step 402 whereby information relating to a product of interest is loaded into the data exchange system application 130 (e.g., specifications, pricing, rebates, etc.), as well as accounting rules made available from one or more third parties (e.g., selling entity 104, manufacturer(s) 140, host system 102, etc.) at step 404. Accounting rules are generally quite different from location to location. Accordingly, in exemplary embodiments, the data exchange system automatically identifies the location and the related accounting rules pertaining to the customer 115. This may be accomplished, e.g., by evaluating existing accounting information stored in SOHO client system 106. In alternate embodiments, the customer 115 may proactively select a location, if desired.

The accounting rules are presented to the SOHO client system 106 at step 406. The rules may be altered via SOHO client system 106 as needed or desired. In other words, the user at SOHO client system 106 need not accept all of the accounting rules provided. The user may also provide input regarding whether the product 122 is still owned by the business of SOHO client system 106. A table 500 illustrating sample accounting information is provided in FIG. 5. The accounting information is organized by location (e.g., country) using column 502. Locations may be defined based upon areas where certain accounting instructions or regulations apply. For example, two locations, The Netherlands and Belgium, may be distinguished from each other in that they have unique accounting rules; however, they may also be combined as one location when the accounting rules to be applied concern regulations relating to the European Union.

The product 122 (or item) is presented in column 504 and the purchase price is presented in column 506. As shown in table 500, the accounting rules for The Netherlands specifies that the depreciation regarding the product 122 (i.e., IBM® Thinkpad™ computer) be spread out over three years (see column 508). The user's financial program 127 will use the accounting rules provided in Depreciation column 508 to handle the depreciation function. It will be understood that other information fields may be provided in table 500 as desired.

Once the accounting information is accepted, the accounting instructions may be loaded into the financial package 127 of SOHO client system 106 at step 408. For instance, the investment of a computer is taken as cost in the current year, but the depreciation is taken over a period of three years, according to the instructions received in the store 104 that apply to the tax system in The Netherlands. Optionally, this step may load all available information into the financial package 127. When the product is sold or discarded, the user may then be prompted to provide details on any financial impact of the sale or loss. Details of this process are provided further in the flow diagram of FIG. 6.

Turning now to FIG. 6, a flow diagram of a process for managing warranty information for a prospective claim via the data exchange system in exemplary embodiments will now be described. A user initiates the process at step 602 and locates the product 122 for which warranty is claimed at step 604. Details about this product 122 have been stored in the user's SOHO client system 106 as described above in FIG. 4. Alternatively, information may be scanned from the RFID tag 124 of the product 122 to obtain information. The data exchange system runs a check to determine if the time span for which warranty can be claimed is still valid at step 606. This warranty information may be stored by one or more of host system 102, manufacturer 140, and selling entity 104. If the warranty is not within the specified time span, the data exchange system presents instructions and a disclaimer to the user at step 608 and the process ends at step 618. The instructions may include information as to the user's remaining options in light of the invalidity determination (e.g., telephone number of a customer service representative associated with the warranty if the user believes the determination was made in error).

If, on the other hand, the product 122 is determined to be within the warranty period at step 606, the data exchange system provides specific information about the terms and conditions of the warranty at step 610. As products often contain multiple variations on, for instance, types of damage covered, and therefore have different warranty clauses, the data exchange system walks the user through a series of steps to determine if the user would be eligible for a warranty claim. This may be an interactive process whereby the user is prompted to provide specific information regarding the condition and/or usage of the product 122. At the end of the process, however, the user may still be prompted with a message that he/she might choose to consult the manufacturer or store if warranty applies.

Once instructed, the data exchange system determines whether a warranty may be claimed at step 612. For example, a product (even though within the warranty period) may not be subject to warranty for failure to take the specified precautions in its care and maintenance (e.g., a cellular telephone is left outside in the rain and is damaged). If the warranty is invalidated at step 612, the user is presented with instructions and a disclaimer at step 608 (as described above) and the process ends at step 618. Otherwise, the process continues at step 614 whereby the warranty information is relayed to the responsible party (e.g., selling entity 104, manufacturer(s) 140) for processing. The data exchange system may also sets a reminder to follow up on the claim after a designated period of time if no reply is received in order to ensure that the claim is being timely processed at step 616. The process ends at step 618.

Figure 7:
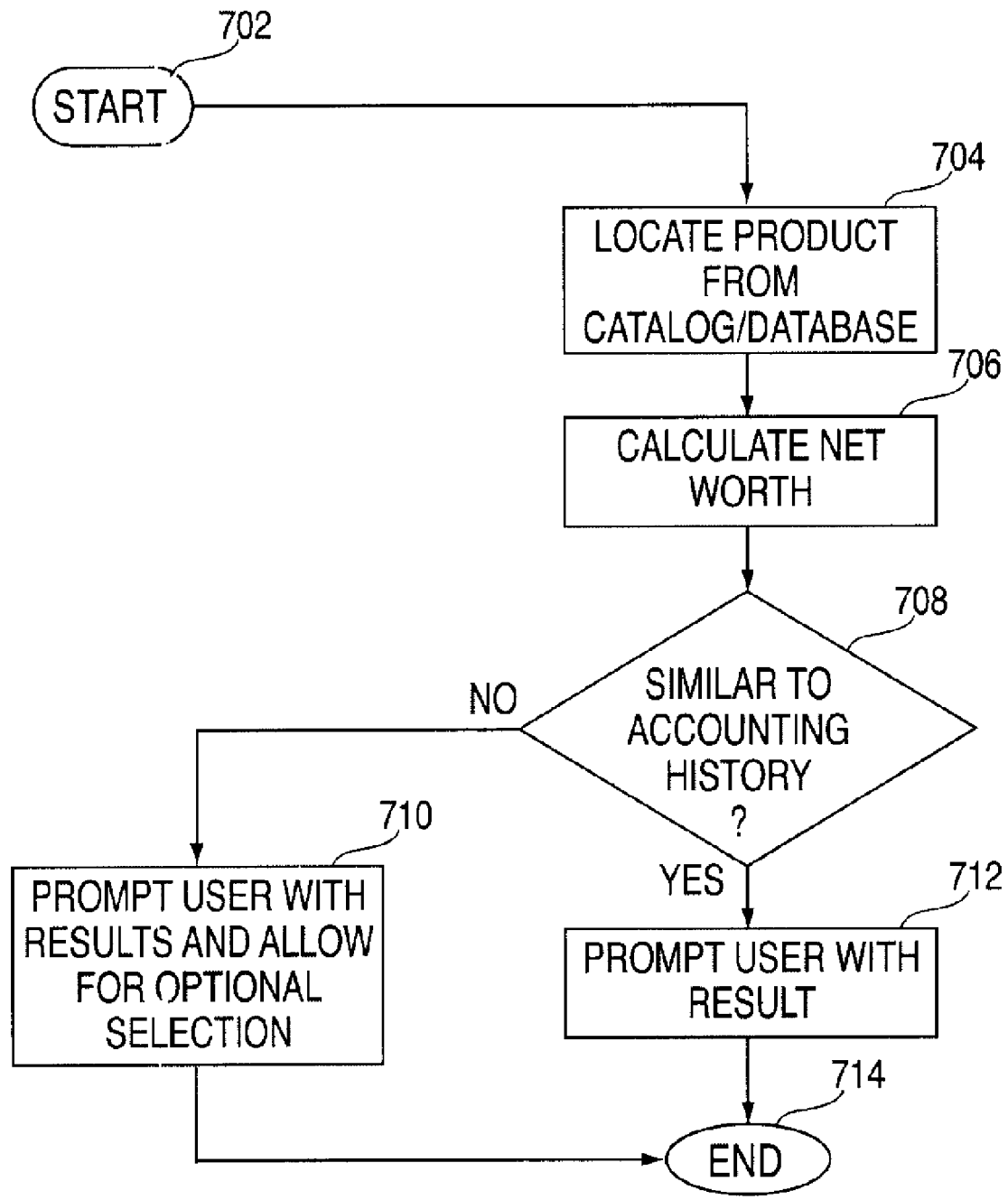
FIG. 7 is a flow diagram of a process for acquiring and managing net worth information via the data exchange system in exemplary embodiments.

Turning now to FIG. 7, a flow diagram of a process for acquiring and managing net worth information via the data exchange system will now be described. The process is initiated at step 702 via user input to, e.g., data exchange system application 130 via host system 102. For example, a user at SOHO client system 106 accesses a web site of the host system 102 using a login/password scheme whereby host system 102 maintains records of the user's transactions. Alternatively, SOHO client system 106 may executive a portion of the data exchange system application 130 for obtaining net worth data relating to a product 122. The product of interest is located at step 704. At step 706, the net worth of the product is determined. Net worth may be calculated based upon the product information that was supplied when the product was purchased. Accounting instructions selected for the product (e.g., depreciation method selected) and the elapsed time since the date of purchase may be used to calculate the net worth. Alternatively, the data exchange system may acquire current market information available from an online resource (e.g., similar products posted for sale on eBay) in determining the net worth. At step 708, the net worth determined in step 706 is compared with the actual historical accounting information. For example, the accounting information may reflect a significant depreciation in the product due to, e.g., marketplace factors and growth in technology related to the product. If the comparison reveals that the net worth and accounting information are the same or similar for the product 122, the results are presented to the user at step 712 and the process ends at step 714. Otherwise, the data exchange system prompts the user with results and enables the user to accept the differences or eliminate the differences by either compensating in the current accounting period or updating the owner's financial package 127 with the information from the actual accounting records at step 710. The process then ends at step 714.

The table 800 of FIG. 8 illustrates sample net worth data provided via the data exchange system. A STORE column 802 provides the name or identification of the store from which the product was purchased. DISCOUNT column 804 refers to the reduction in purchase price for the product or may include extra services a customer is eligible to receive in the store. The VALID THROUGH column 806 refers to a date in which the discount offer expires. The CRITERIA column 808 provides information regarding application of the discount (e.g., based upon the type of product, direct or indirect agreement between the customer and the seller, etc.). These factors may be used to provide real-time information within the store to the customer on an amount the customer will pay for the product, taking into account any discounts.

The data exchange system of the present invention may reside on a stand-alone computer system which may have access to the Internet, or may reside on a computer system which is part of the network through which there is Internet access. With a connection to a network and/or the Internet, there are several different ways in which the process software used to implement the systems and methods of the present invention may be integrated with the network, and deployed using a local network, a remote network, an e-mail system, and/or a virtual private network. The following descriptions review the various ways of accomplishing these activities.

Integration of Data Exchange System Software. To implement the data exchange systems and methods of the present invention, process software, which is composed of the software as described above and related components including any needed data structures, is written and then if desired, integrated into a client, server, and network environment. This integration is accomplished by taking those steps needed to enable the process software to coexist with other application, operating system and network operating system software and then installing the process software on the clients and servers in the environment where the process software will function. An overview of this integration activity will now be provided, followed by a more detailed description of the same with reference to the flowcharts of FIGS. 9A and 9B.

The first step in the integration activity is to identify any software on the clients and servers where the process software will be deployed that are required by the process software or that need to work in conjunction with the process software. This includes the network operating system, which is the software that enhances a basic operating system by adding networking features.

Next, the software applications and version numbers are identified and compared to the list of software applications and version numbers that have been tested to work with the process software. Those software applications that are missing or that do not match the correct version are upgraded with the correct version numbers. Program instructions that pass parameters from the process software to the software applications will be checked to ensure the parameter lists match the parameter lists required by the process software. Conversely, parameters passed by the software applications to the process software will be checked to ensure the parameters match the parameters required by the process software. The client and server operating systems including the network operating systems are identified and compared to the list of operating systems, version numbers, and network software that have been tested to work with the process software. Those operating systems, version numbers, and network software that do not match the list of tested operating systems and version numbers are then upgraded on the clients and servers to the required level.

After ensuring that the software resident on the computer systems where the process software is to be deployed is at the correct version level(s), that is, has been tested to work with the process software, the integration is completed. This is done by installing the process software on the clients and servers. Armed with the foregoing overview of the integration activity, the following detailed description of the same should be readily understood.

Figure 9A:
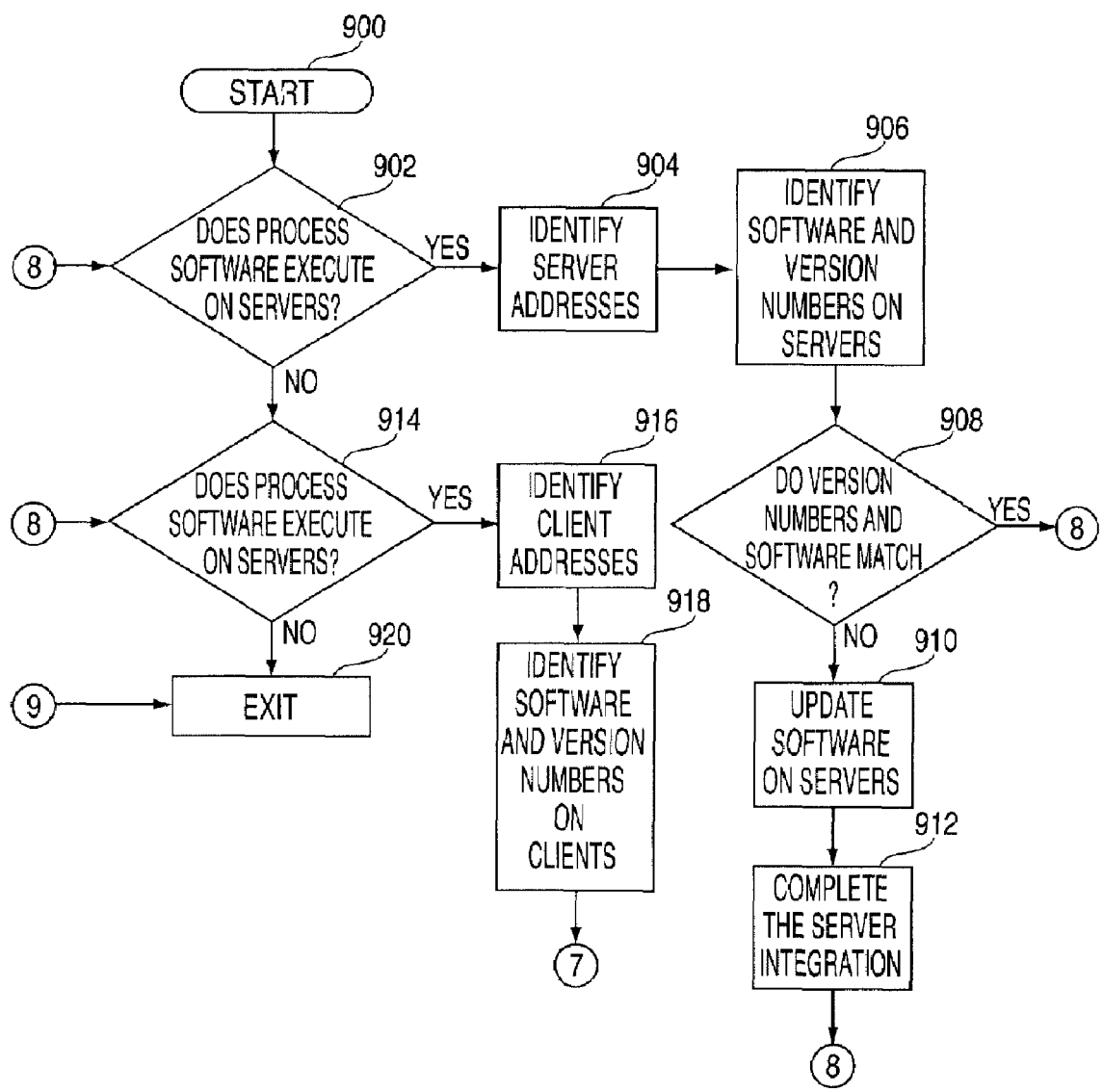
FIGS. 9A and 9B are flowcharts illustrating how the process software implementing the systems and methods of the invention may be integrated into client, server, and network environments.
Figure 9B:
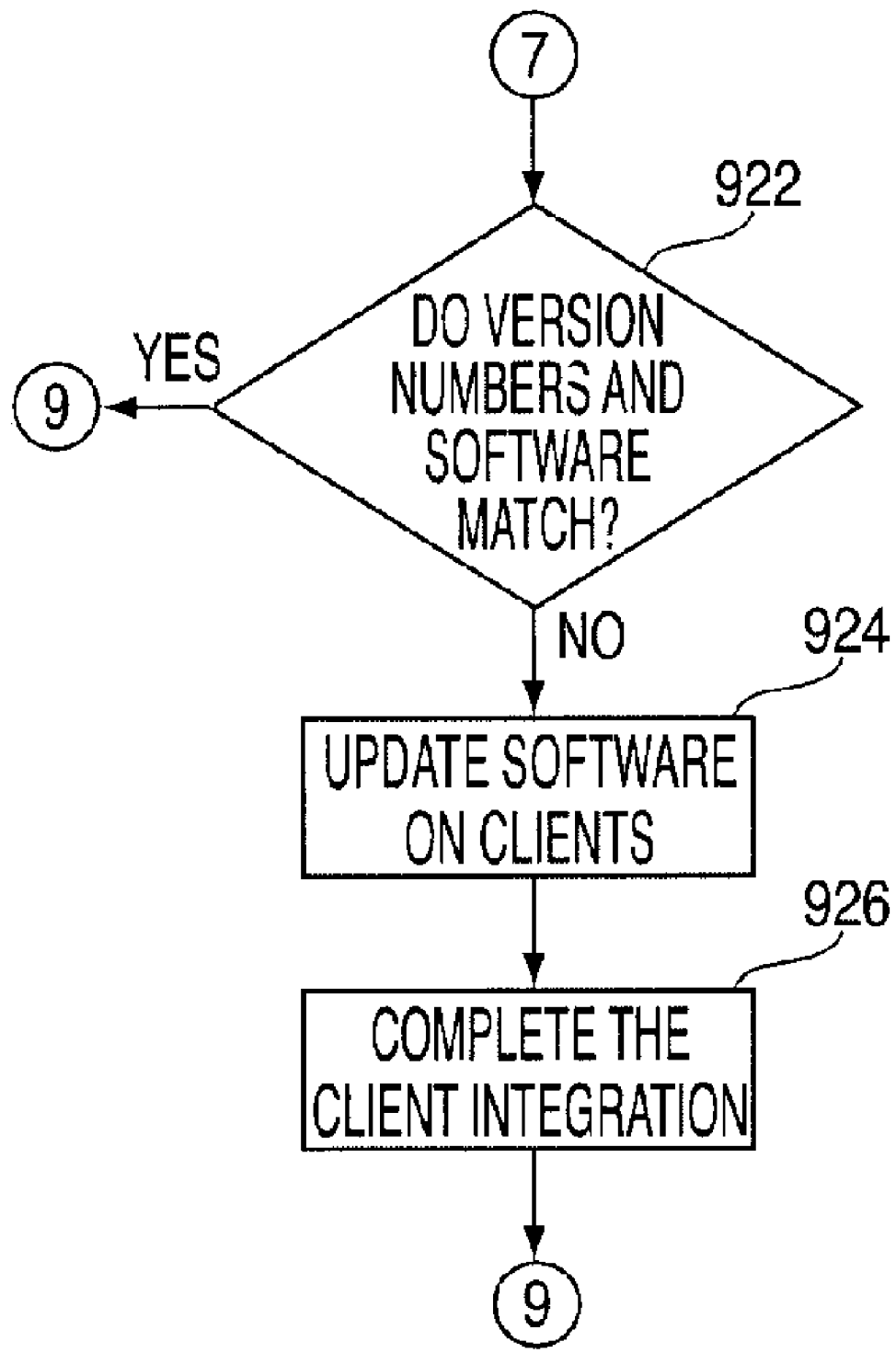

Referring to FIGS. 9A and 9B, step 900 begins the integration of the process software for implementing the search and reference systems and methods of the present invention. It is determined whether there are any process software programs that will execute on a server or servers at step 902. If this is not the case, then integration proceeds to determine if the process software will execute on clients at step 914. If there are process software programs that will execute on a server(s), then the server addresses are identified at step 904. The servers are checked to see if they contain software that includes the operating system (OS), applications, and network operating systems (NOS), together with their version numbers, that have been tested with the process software at step 906. The servers are also checked to determine if there is any missing software that is required by the process software as part of the activity at step 906. A determination is made whether the version numbers match the version numbers of OS, applications and NOS that have been tested with the process software at step 908. If all of the versions match, and there is no missing required software, the integration continues at step 914. If one or more of the version numbers do not match, then the unmatched versions are updated on the server or servers with the correct versions at step 910. Additionally, if there is missing required software, then it is updated on the server or servers at step 910. The server integration is completed by installing the process software at step 912.

Step 914, which follows either step 902, 908 or 912, determines if there are any programs of the process software that will execute on the clients. If no process software programs execute on the clients, the integration proceeds to step 920 and exits. If there are process software programs that will execute on clients, the client addresses are identified at step 916.

At step 918, the clients are checked to see if they contain software that includes the operating system (OS), applications, and network operating systems (NOS) software, together with their version numbers, that have been tested with the process software. The clients are also checked at step 918 to determine if there is any missing software that is required by the process software.

At step 922, a determination is made if the version numbers match the version numbers of OS, applications and NOS that have been tested with the process software. If all of the versions match, and there is no missing required software, then the integration proceeds to step 920 and exits.

If one or more of the version numbers do not match, then the unmatched versions are updated on the clients with the correct versions at step 924. In addition, if there is missing required software, then it is updated on the clients as part of step 924. The client integration is completed by installing the process software on the clients at step 926. The integration proceeds to step 920 and exits.

Deployment of Data Exchange System Software. It should be well understood that the process software for implementing the data exchange system of the present invention may be deployed by manually loading the process software directly into the client, server, and proxy computers from a suitable storage medium such as a CD, DVD, etc. It is useful to provide an overview of still other ways in which the process software may also be automatically or semi-automatically deployed into one or more computer systems. The process software may be deployed by sending or loading the process software to a central server or a group of central servers. From there, the process software may then be downloaded into the client computers that will execute the process software. Alternatively, the process software may be sent directly to the client system via e-mail. The process software is then either detached to a directory or loaded into a directory by a button on the e-mail that executes a program that detaches the process software attached to the e-mail into a directory. Another alternative is to send the process software directly to a directory on the hard drive of a client computer. Also, when there are proxy servers, the automatic or self-automatic deployment process will select the proxy server code, determine on which computers to place the proxy servers' code, transmit the proxy server code, and then install the proxy server code on the proxy computer. The process software will be transmitted to the proxy server and then stored on the proxy server. Armed with this overview of the possible deployment processes, the following detailed description of the same with reference to FIGS. 10A and 10B, where the deployment processes are illustrated, will be more easily understood.

Step 1000 begins the deployment of the process software. It is determined whether there are any programs that will reside on a server or servers when the process software is executed at step 1002. If the answer is "yes", then the servers that will contain the executables are identified, as indicated in step 1036 in FIG. 10B. The process software for the server or servers is transferred directly to the servers' storage via FTP or some other protocol or by copying though the use of a shared file system at step 1038. The process software is then installed on the servers as indicated at step 1040.

Figure 10A:
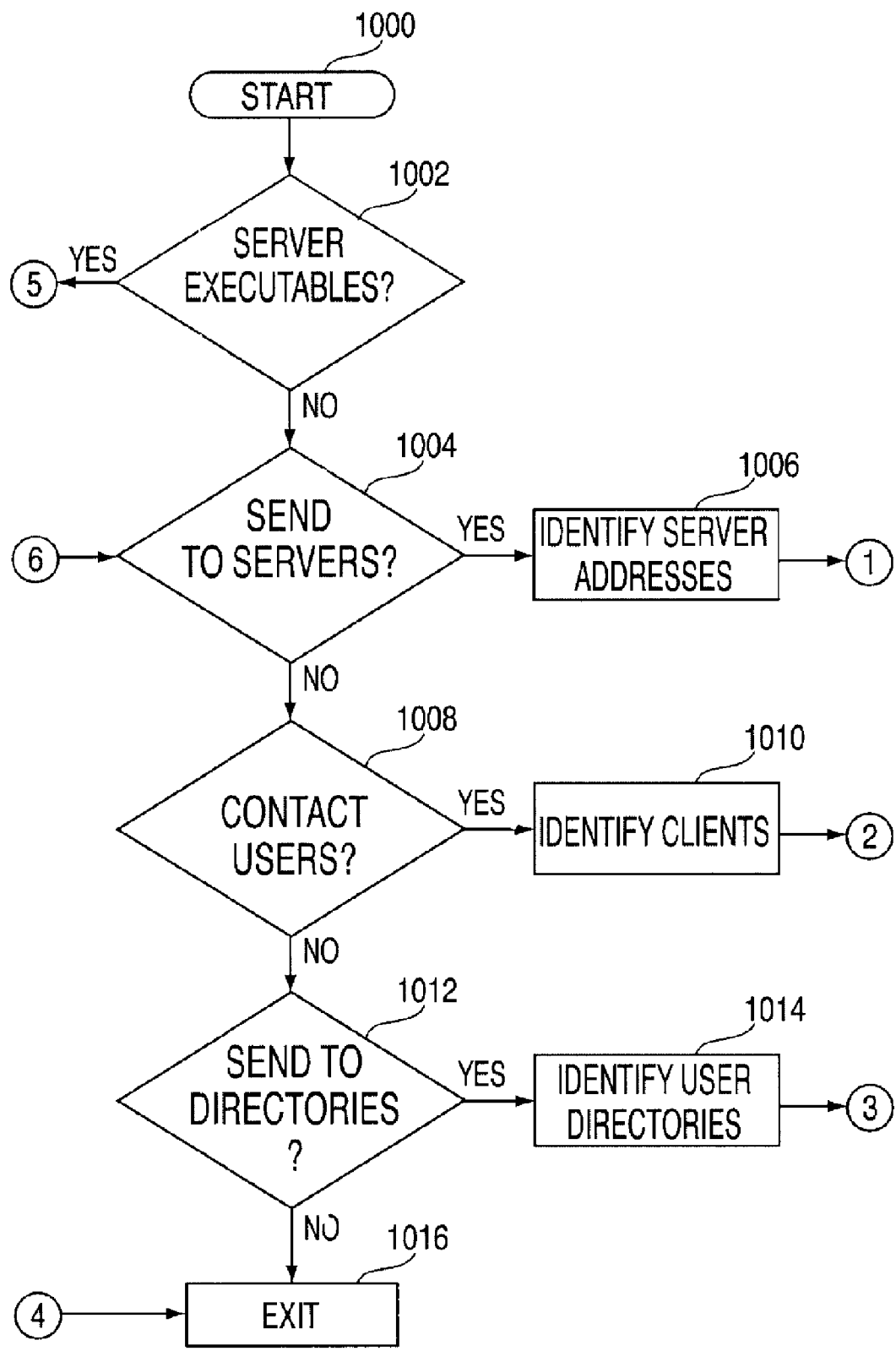
FIGS. 10A and 10B are flowcharts illustrating various ways in which the process software of the invention may be semi-automatically or automatically deployed across various networks and onto server, client (user), and proxy computers.
Figure 10B:
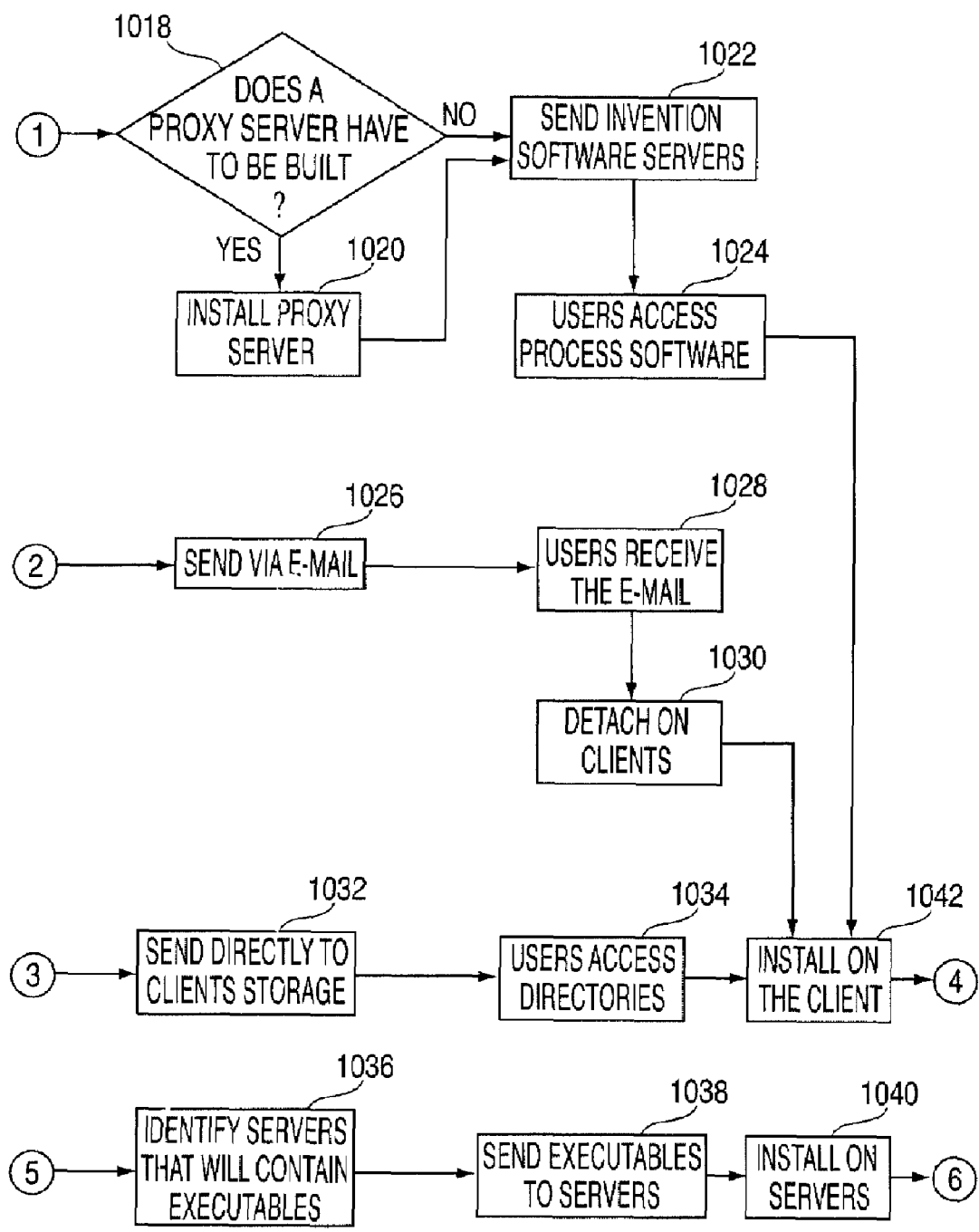

Next, as shown in step 1004 in FIG. 10A, a determination is made on whether the process software is to be deployed by having users access the process software on a server or servers. If the users are to access the process software on servers, then the server addresses that will store the process software are identified at step 1006.

Next, as shown at step 1018, a determination is made if a proxy server is to be built to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed as indicated at step 1020. Next, the process software for implementing the present invention is sent to the servers, as indicated in step 1022 either via a protocol such as FTP or it is copied directly from the source files to the server files via file sharing. Another way of sending the process software to the servers is to send a transaction to the servers that contained the process software and have the server process the transaction. In this manner, the process software may be received by and copied into the server's file system. Once the process software is stored at the servers, the users via their client computers, then access the process software on the servers and copy it into to the file systems of their client computers at step 1024. Another alternative is to have the servers automatically copy the process software to each client and then run the installation program for the process software at each client computer. Either way, the user computer executes or causes to be executed the program that installs the process software on the client computer at step 1042, then the process exits at step 1016.

Continuing now at step 1008 in FIG. 10A, a determination is made as to whether the process software is to be deployed by sending the process software to users via e-mail. If the answer is yes, then, as indicated at step 1010, the set of users where the process software will be deployed are identified together with the addresses of the user client computers. The process software is sent via e-mail in step 1026 (shown in FIG. 10B) to each of the users' client computers. Then, as indicated in step 1028, the users receive the e-mail, and then detach the process software from the e-mail to a directory on their client computers at step 1030. The user then executes the program that installs the process software on his client computer at step 1042, and then exits the process at step 1016.

Continuing at step 1012 (see bottom of FIG. 10A), a determination is made on whether the process software will be sent directly to user directories on their client computers. If so, the user directories are identified at step 1014. Then, the process software is transferred directly to the identified directory on the user's client computer, as indicated in step 1032. This can be done in several ways such as, but not limited to, sharing of the file system directories and then copying them from the sender's file system to the recipient user's file system or, alternatively, using a transfer protocol such as File Transfer Protocol (FTP). Next, the users access the directories on their client file systems, as indicated in step 1034, in preparation for installing the process software. Finally, the user executes the program that installs the process software on his client computer at step 1042 and then exits the process at step 1016.

Use of Virtual Private Networks for Data Exchange System Software. The process software may be deployed, accessed and executed through the use of a virtual private network (VPN). A VPN is any combination of technologies that can be used to secure a connection through an otherwise unsecured or untrusted network. VPNs are used to improve security and can often also reduce operational costs. The VPN makes use of a public network, usually the Internet, to connect remote sites or users together. Instead of using a dedicated, real-world connection such as a leased line, the VPN uses "virtual" connections routed through the Internet from the company's private network to the remote site or employee(s). Access to the software via a VPN can be provided as a service by specifically constructing the VPN for purposes of delivery or execution of the process software (i.e., the software resides elsewhere). In such an instance, the lifetime of the VPN is often limited to a given period of time or to a given number of deployments based on an amount paid.

The process software may be deployed, accessed, and executed through either a remote-access VPN or a site-to-site VPN. When using a remote-access VPN, the process software is typically deployed, accessed, and executed via the secure, encrypted connections between a company's private network and remote users through a third-party service provider. The enterprise service provider (ESP) sets up and/or authorizes access to a network access server (NAS) and provides the remote users with desktop client software for their computers. The telecommuters can then dial a phone number (often a toll-free number) or attach directly via a cable, DSL, or wireless modem to reach the NAS and use their VPN client software to access the corporate network and to access, download, and execute the process software.

When using a site-to-site VPN, the process software is typically deployed, accessed and executed through the use of dedicated equipment and large-scale encryption. These tools are often used to connect multiple fixed sites of a larger company over a public network such as the Internet.

The process software is transported over the VPN via a process called tunneling. Tunneling is process involving the placing of an entire packet within another packet and sending it over a network. The protocol of the outer packet is understood by the network and by both points, called tunnel interfaces, where the packet enters and exits the network. Tunneling generally encapsulates the private network data and protocol information within the public network transmissions so that the private network protocol information appears to the public network simply as unintelligible data. Armed with the foregoing overview of virtual private networks and how they operate and how they may be used to transport the process software, the following more detailed description of same with reference to the flowcharts of FIGS. 11A-11C should be more readily understood.

Figure 11A:
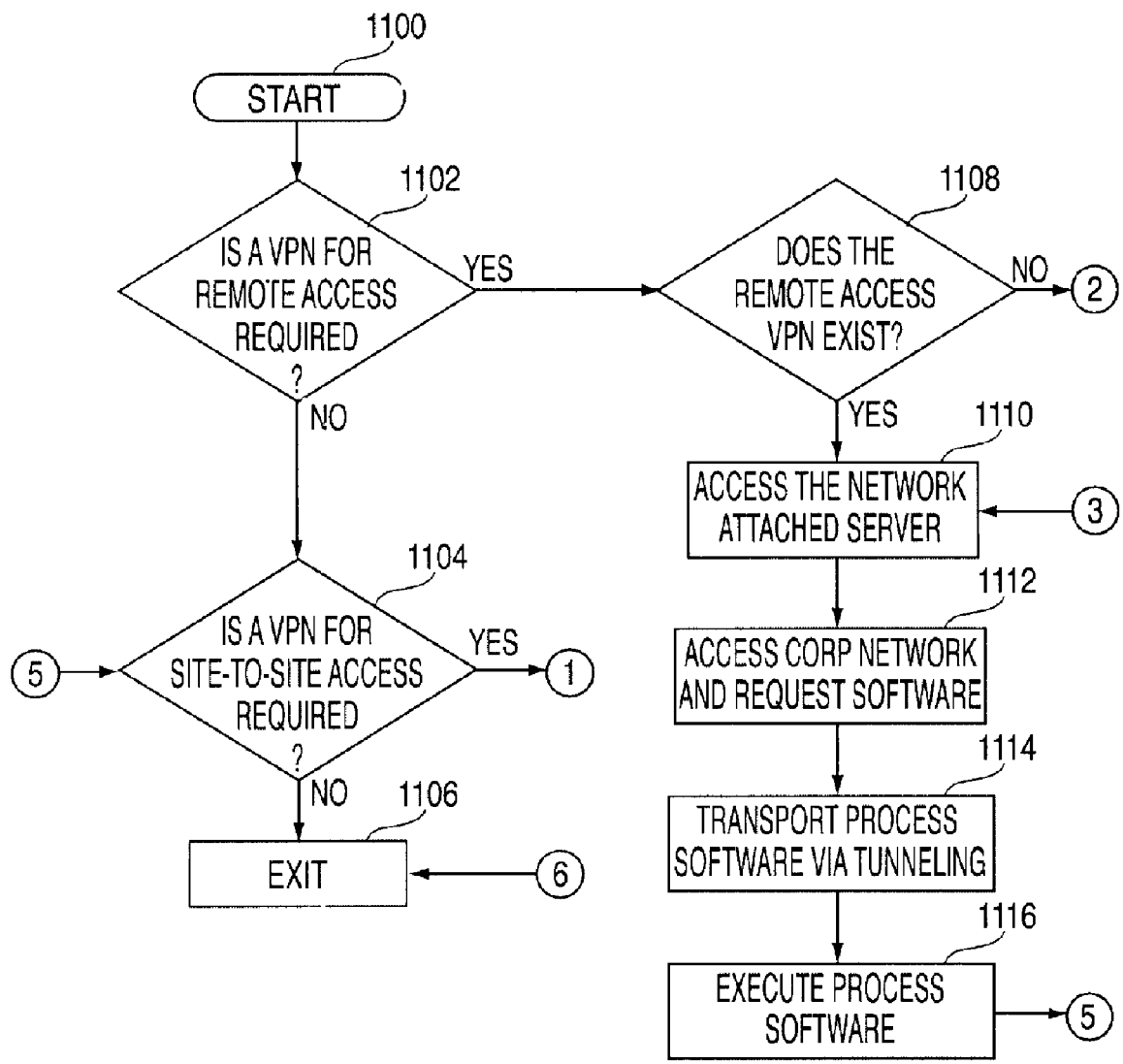
FIGS. 11A through 11C are flowcharts illustrating how process software for implementing the systems and methods of the invention are deployed through the installation and use of two different forms of a virtual private network (VPN)
Figure 11B:
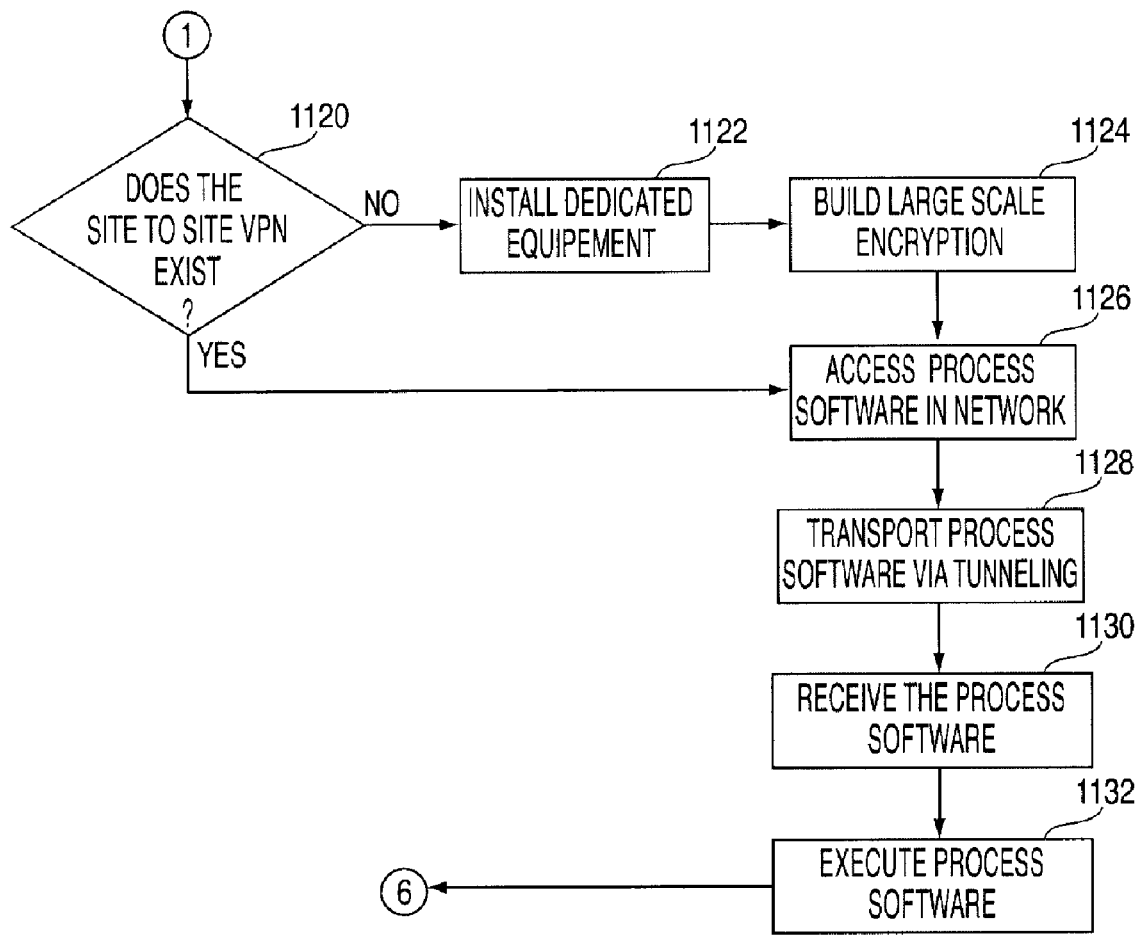
Figure 11C:
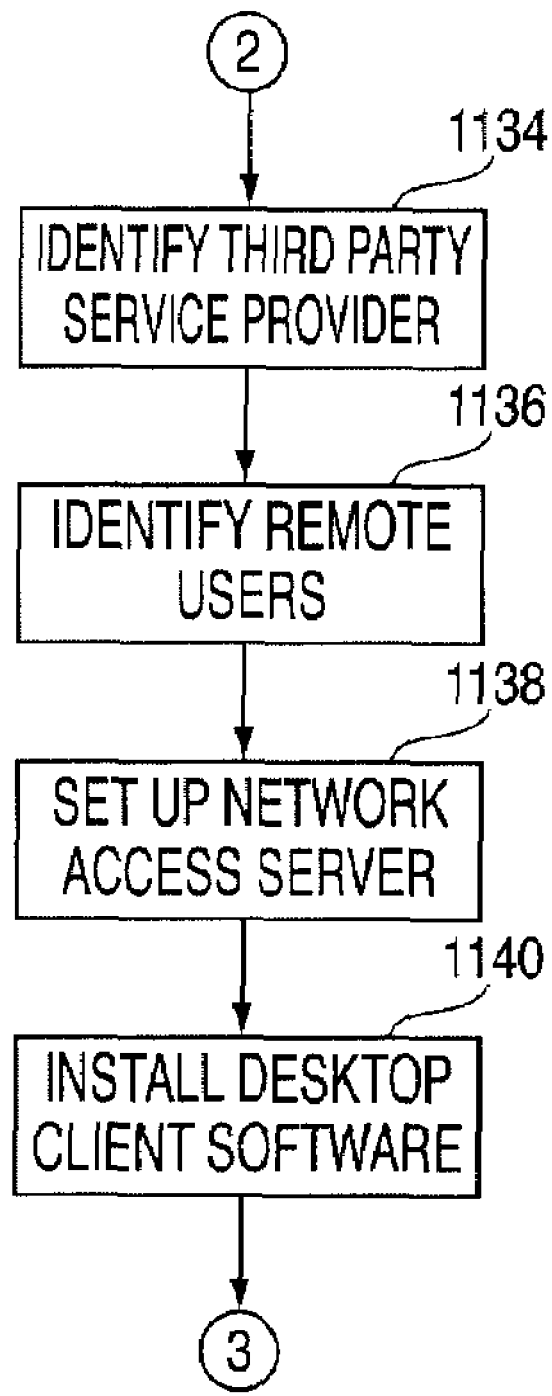

Step 1100 in FIG. 11A begins the virtual private network (VPN) process. A determination is made at step 1102 to see if a VPN for remote access is required. If it is not required, then flow proceeds to step 1104. If it is required, then flow proceeds to step 1108 where a determination is made as to whether a remote access VPN exists that is available for use.

If a remote access VPN does exist, then flow proceeds to step 1110 in FIG. 11A. Otherwise flow proceeds to step 1134 (see top of FIG. 11C), where a third party provider that will provide the secure, encrypted connections between the company's private network and the company's remote users is identified. Next, as indicated in step 1136, the company's remote users are identified. Then, at step 1138, the identified third party provider then sets up a network access server (NAS). The NAS allows the remote users to dial a phone number (typically a toll free number) or attach directly via a cable, DSL, wireless or other modem to access, download and install the desktop client software for the remote-access VPN as indicated at step 1140.

Returning to step 1110 in FIG. 11A, after the remote access VPN has been built or if it been previously installed, the remote users can then access the process software by dialing into the NAS or attaching directly via a cable, DSL, or other modem into the NAS. This step 1110 allows entry into the corporate network, as indicated at step 1112, where the process software may be accessed. The process software is transported to the remote user's desktop computer over the network via tunneling. During tunneling, see step 1114, the process software is divided into packets and each packet, including the data and protocol for that packet, is placed within another packet. When the process software arrives at the remote user's desktop computer, it is removed from the packets, reconstituted, and then may be executed on the remote users desktop, as indicated at step 1116.

Returning now to step 1104 in FIG. 11A, a determination is made to see if a VPN for site-to-site access is required. If it is not required, then the process exits at step 1106. If it is required, flow proceeds to step 1120 (see top of FIG. 11B) to determine if the site-to-site VPN exists. If it does exist, then flow proceeds to step 1126. If it does not exist, then as indicated at step 1122, dedicated equipment required to establish a site-to-site VPN is installed. Then the large-scale encryption is built into the VPN at step 1124.

After the site-to-site VPN has been built or if it had been previously established, the users access the process software via the VPN as indicated in step 1126. Next, the process software is transported to the site users over the network via tunneling as indicated in step 1128. As previously explained, the process software is divided into packets and each packet including the data and protocol is placed within another packet, as indicated in step 1130. When the process software arrives at the remote user's desktop, it is removed from the packets, reconstituted, and is executed on the site users desktop at step 1132. The process then proceeds to step 1106 and exits.

Figure 12A:
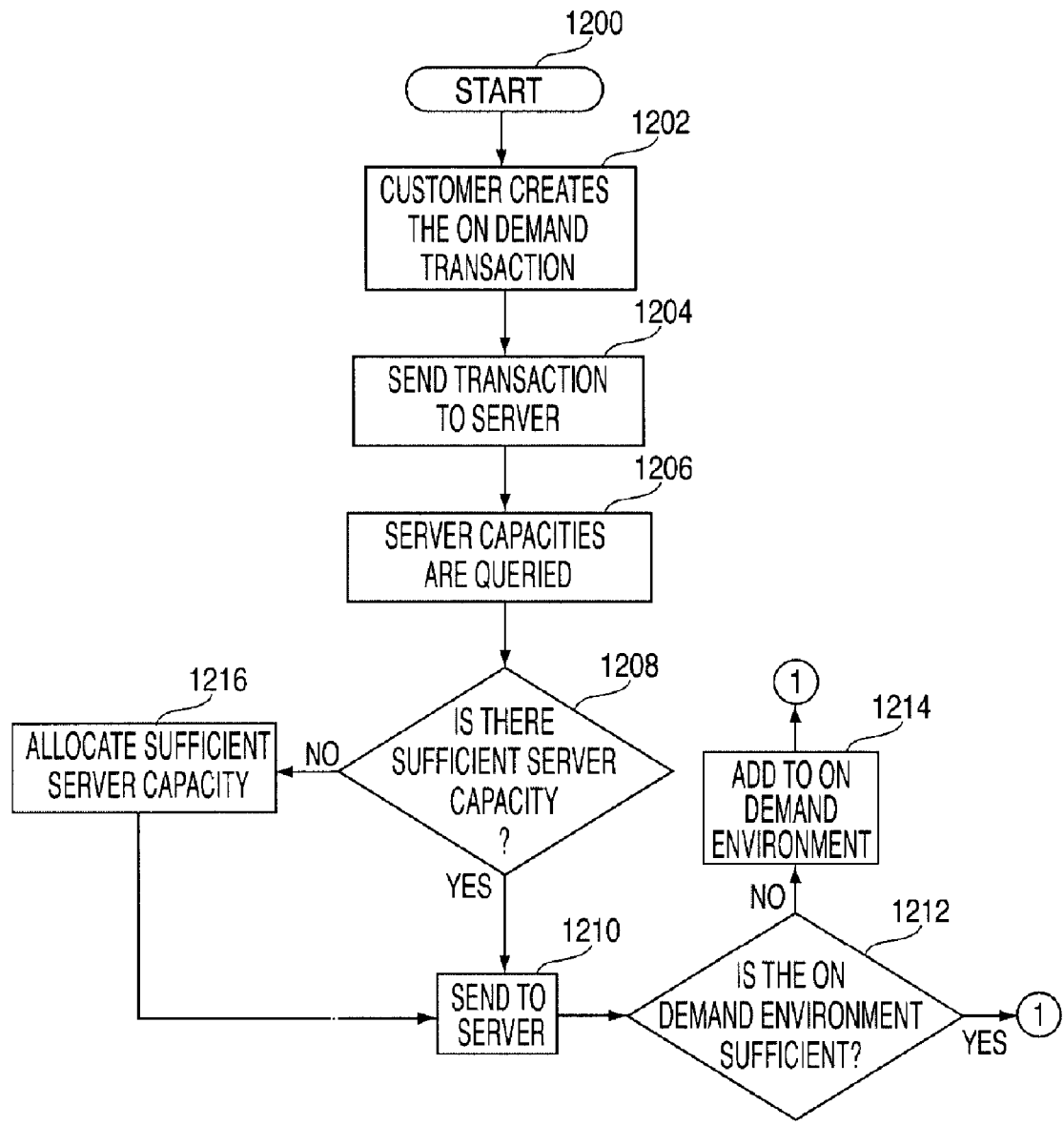
FIGS. 12A and 12B are flowcharts illustrating how the process software for implementing the systems and methods of the invention can be deployed through an On Demand business model, which allows the process software to be shared and simultaneously service multiple customers in a flexible, automated fashion under a pay-for-what-you-use plan.
Figure 12B:
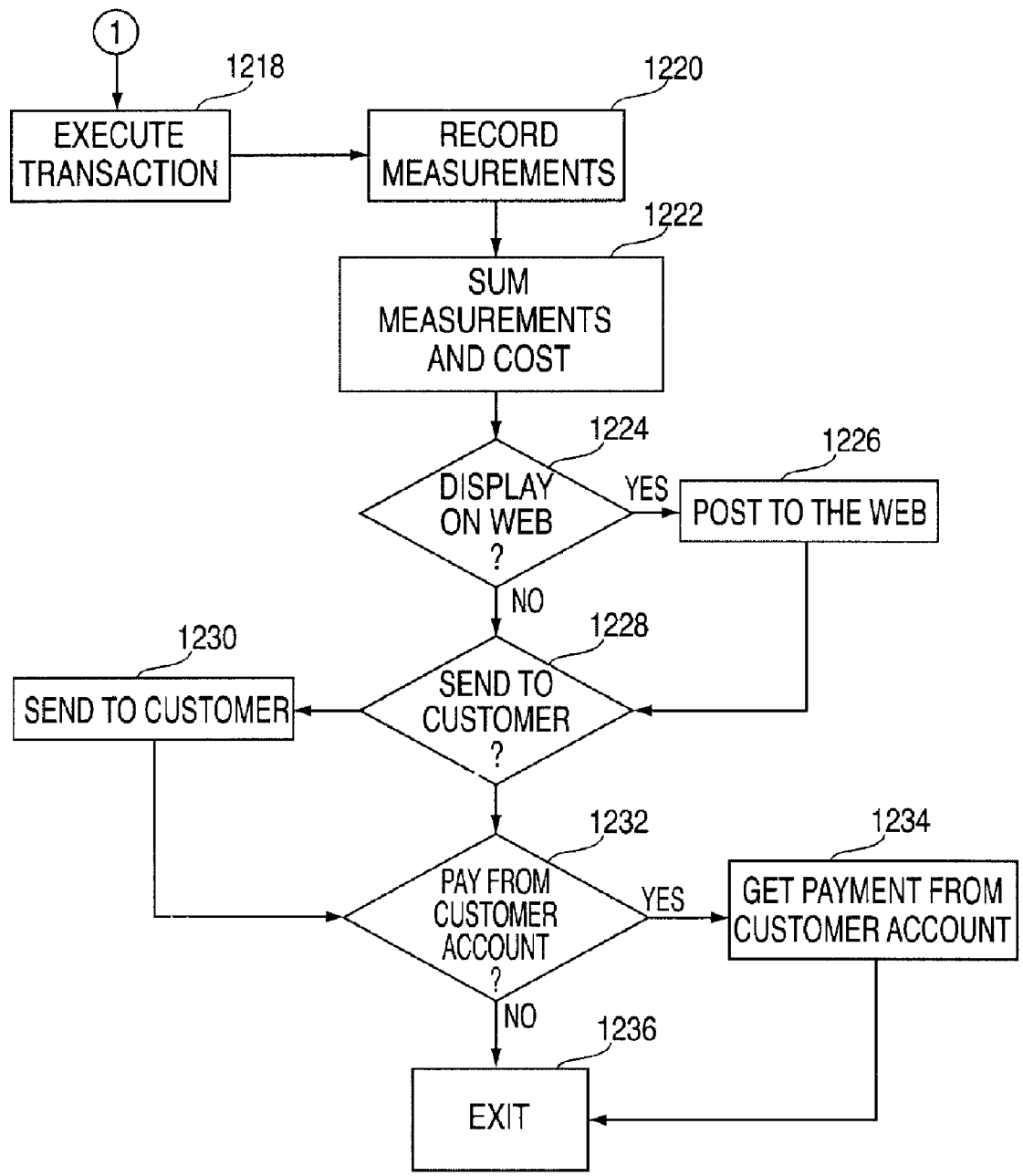

On Demand Computing for Data Exchange System Software. The process software for implementing the data exchange system of the present invention may be shared; that is, it may be used to simultaneously serve multiple customers in a flexible, automated fashion. It is process software that is easily standardized, requiring little customization, and it is scalable, thus providing capacity on demand in a pay-as-you-go model known as "on demand" computing. An overview of on demand computing as applied to the data exchange system software will now be provided, followed by a more detailed description of same made with reference to the flowcharts of FIGS. 12A and 12B.

The process software for implementing the present invention can be stored on a shared file system accessible from one or more servers. The process software may be executed via transactions that contain data and server processing requests that use measurable CPU units on the accessed server. CPU units are units of time such as minutes, seconds, and hours on the central processor of the server. Additionally, the accessed server may make requests of other servers that require CPU units. CPU units are an example that represents but one measurement of use. Other measurements of use include, but are not limited to, network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc., approach a capacity so as to affect performance, additional network bandwidth, memory usage, storage etc. are added as needed to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer who then remits payment to the service provider.

In another embodiment, the service provider requests payment directly from a customer account at a banking or financial institution. In yet another embodiment, if the service provider is also a customer of the customer that uses the process software application, the payment owed to the service provider is reconciled to the payment owed by the service provider to minimize the transfer of payments. Armed with the foregoing overview, the detailed description of the on demand computing with respect to the process software, and the following detailed description of same with reference to FIGS. 12A and 12B where the on demand processes are illustrated, will be more easily understood.

Step 1200 begins the On Demand process. A transaction is created that contains the unique customer identification, the requested service type and any service parameters that further specify the type of service as indicated in step 1202. The transaction is then sent to the main server as shown in step 1204. In an On Demand environment, the main server may initially be the only server. Then, as capacity is consumed, other servers are added to the On Demand environment.

The server central processing unit (CPU) capacities in the On Demand environment are queried at step 1206. The CPU requirement of the transaction is estimated, then the servers' available CPU capacity in the On Demand environment are compared to the transaction CPU requirement to see if there is sufficient CPU available capacity in any server to process the transaction as indicated in step 1208. If there is not sufficient server CPU available capacity, then additional server CPU capacity is allocated to process the transaction as indicated in step 1216. If there was already sufficient available CPU capacity, the transaction is sent to a selected server at step 1210.

Before executing the transaction, a check is made of the remaining On Demand environment to determine if the environment has sufficient available capacity for processing the transaction as indicated at step 1212. This environment capacity consists of elements such as, but not limited to, network bandwidth, processor memory, storage, etc. If there is insufficient available capacity, then capacity will be added to the On Demand environment as indicated in step 1214. Next the required software to process the transaction is accessed, loaded into memory, and the transaction is executed as indicated in step 1218.

The usage measurements are recorded as indicated in step 1220. The usage measurements consist of the portions of those functions in the On Demand environment that are used to process the transaction. The usage of functions such as, but not limited to, network bandwidth, processor memory, storage and CPU cycles are what is recorded. The usage measurements are summed, multiplied by unit costs, and then recorded as a charge to the requesting customer as indicated in step 1222.

If the customer has requested that the On Demand costs be posted to a web site as indicated in step 1224, then they are posted to a web site at step 1226. If the customer has requested that the On Demand costs be sent via e-mail to a customer address as indicated in step 1228, then they are sent to the customer via e-mail as indicated in step 1230. If the customer has requested that the On Demand costs be paid directly from a customer account at step 1232, then payment is received directly from the customer account at step 1234. The On Demand process proceeds to step 1236 and then exits.

Exemplary embodiments of the present invention provide a variety of useful information regarding purchases at the point of sale or pre-sale period. Product specifications, pricing, taxes, manufacturer warranty registration and rebates, and other data are acquired from various sources such as manufacturing enterprises, selling entities, financial institutions, etc.). Embodiments of the invention acquire, organize, and facilitate dissemination of this information on behalf of individual consumers and/or businesses. Accounting information, warranties, and net worth are some of the information that is managed by the invention. This information may be transferred to designated parties in several manners, including e.g., wireless transfer to a mobile computing device, via email, web access, etc.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for implementing transaction-based data exchange updates by one or more computer processors in communication over a communication network, the method comprising:
   transferring, via a data exchange system application executing on at least one of the computer processors, information relating to a product that is transferred via a transmission means selected by an individual using one of the computer processors, the individual requesting the information, the information including warranty information, accounting depreciation instructions, pricing information, and product details;
   acquiring accounting instructions, the accounting instructions originating from government regulation and based on a geographic location of the individual, the acquiring based on at least one of:
      automatically identifying the geographic location of the individual; and
      evaluating existing accounting information, the existing accounting information stored on a client system of the individual and accessible by the data exchange system;
   calculating, by the one or more computer processors, a current net worth of the product, the current net worth determined using;
      product information supplied at time of purchase, the product information including:
         product specifications;
         product identification information;
         warranty information;
         promotions;
         discounts;
         preferred customer pricing; and
         service information; and
      the accounting instructions in combination with elapsed time since date of purchase, the accounting instructions comprising the accounting instructions;
   comparing, by the data exchange system application, results of the calculating with historical accounting information, the historical accounting information including factors that are determined to impact the current net worth, the factors including at least one of:
      depreciation due to market place factors; and
      changes in technology related to the product;
   adjusting, by the data exchange system application, the results of the calculating based on the comparing; and
   updating, via the selected transmission means, a financial application of the computer processor associated with the individual, the financial application updated with the adjusted results of the calculating;
   providing results of the updating to the individual.

2. The method of claim 1, further comprising:
   acquiring the information relating to a product from at least one of:
      a selling entity;
      a manufacturing entity; and
      a product catalog.

3. The method of claim 1, wherein the warranty information includes at least one of:
   terms and conditions;
   warranty period; and
   product identification.

4. The method of claim 1, wherein the accounting rules include at least one of:
   depreciation rules; and
   tax rules.

5. The method of claim 1, wherein the pricing information includes at least one of:
   retail price;
   price after discount;
   price after rebate;
   promotional price; and
   preferred customer price.

6. The method of claim 1, wherein the product details include at least one of:
   product specifications;
   product model; and
   product images.

7. The method of claim 1, wherein the information is requested by the individual at a physical point of sale.

8. The method of claim 1, further comprising deploying process software for implementing said transaction-based data exchange for an information management system, said deploying comprising:
   installing said process software on at least one server;
   identifying server addresses for users accessing said process software on said at least one server;
   installing a proxy server if needed;
   sending said process software to said at least one server and copying said process software to a file system of said at least one server;
   sending the process software to at least a first client computer; and
   executing said process software on said first client computer.

9. The method of claim 8, wherein said installing said process software further comprises:

determining if programs will reside on said at least one server when said process software is executed;
identifying said at least one server that will execute said process software; and
transferring said process software to storage for said at least one server.

10. The method of claim 8, wherein said sending said process software to said first client computer further includes having said at least one server automatically copy said process software to said first client computer, and running an installation program at said first client computer to install said process software on said first client computer.

11. The method of claim 8, wherein said sending said process software to said first client computer further comprises identifying a user and an address of said first client computer.

12. The method of claim 8, wherein said sending said process software to said first client computer includes sending said process software to at least one directory on said first client computer.

13. The method of claim 8, wherein said sending said process software to said first client computer includes sending said process software to said first client computer via e-mail.

14. The method of claim 1, further comprising integrating process software for implementing said transaction-based data exchange for an information management system, said integrating comprising:
determining if said process software will execute on at least one server;
identifying an address of said at least one server;
checking said at least one server for operating systems, applications, and version numbers for validation with said process software, and identifying any missing software applications for said at least one server that are required for integration;
updating said at least one server with respect to any operating system and application that is not validated for said process software, and providing any of said missing software applications for said at least one server required for said integration;
identifying client addresses and checking client computers for operating systems, applications, and version numbers for validation with said process software, and identifying any software applications missing from said client computers that are required for integration;
updating said client computers with respect to any operating system and application that is not validated for said process software, and providing any missing software application for said client computers required for said integration; and
installing said process software on said client computers and said at least one server.

15. The method of claim 1, further comprising on-demand sharing of process software for implementing said transaction-based data exchange for an information management system, said on demand sharing comprising:
creating a transaction containing unique customer identification, requested service type, and service parameters;
sending said transaction to at least one main server;
querying said at least one main server about processing capacity associated with said at least one main server to help ensure availability of adequate resources for processing of said transaction; and
allocating additional processing capacity when additional capacity appears needed to process said transaction, said additional processing capacity being selected from the group of additional capacities consisting of central processing unit capacity, processor memory capacity, network bandwidth capacity, and storage capacity.

16. The method of claim 15, further comprising recording a plurality of usage measurements selected from the group of usage measurements consisting of network bandwidth, processor memory, storage, and central processing unit cycles.

17. The method of claim 16, further comprising:
summing said usage measurements
acquiring at least one multiplicative value associated with said usage measurements and with unit costs; and
recording any such acquired multiplicative value as an on demand charge to a requesting customer.

18. The method of claim 17, further comprising at least one of:
posting said on demand charge on a web site if requested by said requesting customer; and
sending said on demand charge via e-mail to said requesting customer's e-mail address.

19. The method of claim 17, further comprising charging said on demand charge to said requesting customer's account if an account exists and if said requesting customer has selected a charge account payment method.

20. The method of claim 1, further comprising deploying, accessing, and executing process software for implementing said transaction-based data exchange for an information management system, said deploying, accessing, and executing process software implemented through a virtual private network, the method further comprising:
determining if a virtual private network is required;
checking for remote access to said virtual private network when it is required;
if said remote access does not exist, identifying a third party provider to provide secure, encrypted connections between a private network and remote users;
identifying said remote users; and
setting up a network access server operable for downloading and installing client software on desktop computers for remote access of said virtual private network;
accessing said process software;
transporting said process software to at least one remote user's desktop computer; and
executing said process software on said at least one remote user's desktop computer.

21. The method of claim 20, further comprising:
determining if said virtual private network has a site-to-site configuration for providing site-to-site access, and if said virtual private network is not so available, installing equipment required to establish a site-to-site configuration for said virtual private network;
installing large scale encryption into said site-to-site virtual private network; and
accessing said process software through said site-to-site configuration with large scale encryption.

22. The method of claim 21, wherein said accessing said process software further comprises at least one of:
dialing into said network access server, and
attaching directly via a modem into said network access server, said modem being selected from the group of modems consisting of telephone dial-up modems, cable modems, DSL modems, and wireless modems.

23. The method of claim 1 further comprising:
determining if the individual requesting the information is a post-sale customer;
determining if the individual requesting the information is authorized to receive the information; and automatically registering the purchased product with a warranty provider using personal information provided by the individual requesting the information when it is determined that the individual is a post-sale customer and is authorized to receive the information.

24. A storage medium encoded with machine-readable program code for implementing transaction-based data exchange, which when executed by the computer cause the computer to implement a method, comprising:

transferring, via a data exchange system application executing on at least one of the computer processors, information relating to a product that is transferred via a transmission means selected by an individual using one of the computer processors, the individual requesting the information, the information including warranty information, accounting depreciation instructions, pricing information, and product details;

acquiring accounting instructions, the accounting instructions originating from government regulation and based on a geographic location of the individual, the acquiring based on at least one of:

automatically identifying the geographic location of the individual; and evaluating existing accounting information, the existing accounting information stored on a client system of the individual and accessible by the data exchange system;

calculating, by the one or more computer processors, a current net worth of the product, the current net worth determined using:

product information supplied at time of purchase, the product information including:

product specifications;

product identification information;

warranty information;

promotions;

discounts;

preferred customer pricing; and service information; and the accounting instructions in combination with elapsed time since date of purchase, the accounting instructions comprising the accounting instructions;

comparing, by the data exchange system application, results of the calculating with historical accounting information, the historical accounting information including factors that are determined to impact the current net worth, the factors including at least one of:

depreciation due to market place factors; and changes in technology related to the product;

adjusting, by the data exchange system application, the results of the calculating based on the comparing; and updating, via the selected transmission means, a financial application of the computer processor associated with the individual, the financial application updated with the adjusted results of the calculating;

providing results of the updating to the individual.

25. The storage medium of claim 24, further comprising instructions for causing the computer to implement:

acquiring the information relating to a product from at least one of:

a selling entity;

a manufacturing entity; and a product catalog.

26. The storage medium of claim 24, wherein the warranty information includes at least one of:

terms and conditions;

warranty period; and product identification.

27. The storage medium of claim 24, wherein the accounting rules include at least one of:

depreciation rules; and tax rules.

28. The storage medium of claim 24, wherein the pricing information includes at least one of:

retail price;

price after discount;

price after rebate;

promotional price; and preferred customer price.

29. The storage medium of claim 24, wherein the product details include at least one of:

product specifications;

product model; and product images.

30. The storage medium of claim 24, further comprising instructions for causing the computer to implement deploying process software for implementing said transaction-based data exchange for an information management system, said deploying comprising:

installing said process software on at least one server;

identifying server addresses for users accessing said process software on said at least one server;

installing a proxy server if needed;

sending said process software to said at least one server and copying said process software to a file system of said at least one server;

sending the process software to at least a first client computer; and executing said process software on said first client computer.

31. The storage medium of claim 30, wherein said installing said process software further comprises:

determining if programs will reside on said at least one server when said process software is executed;

identifying said at least one server that will execute said process software; and transferring said process software to storage for said at least one server.

32. The storage medium of claim 30, wherein said sending said process software to said first client computer further includes having said at least one server automatically copy said process software to said first client computer, and running an installation program at said first client computer to install said process software on said first client computer.

33. The storage medium of claim 30, wherein said sending said process software to said first client computer further comprises identifying a user and an address of said first client computer.

34. The storage medium of claim 30, wherein said sending said process software to said first client computer includes sending said process software to at least one directory on said first client computer.

35. The storage medium of claim 30, wherein said sending said process software to said first client computer includes sending said process software to said first client computer via e-mail.

36. The storage medium of claim 24, further comprising instructions for causing the computer to implement integrating process software for implementing said transaction-based data exchange for an information management system, said integrating comprising:

determining if said process software will execute on at least one server;

identifying an address of said at least one server;

checking said at least one server for operating systems, applications, and version numbers for validation with said process software, and identifying any missing software applications for said at least one server that are required for integration;

updating said at least one server with respect to any operating system and application that is not validated for said process software, and providing any of said missing software applications for said at least one server required for said integration;

identifying client addresses and checking client computers for operating systems, applications, and version numbers for validation with said process software, and identifying any software applications missing from said client computers that are required for integration;

updating said client computers with respect to any operating system and application that is not validated for said process software, and providing any missing software application for said client computers required for said integration; and installing said process software on said client computers and said at least one server.

37. The storage medium of claim 24, further comprising instructions for causing the computer to implement on-demand sharing of process software for implementing said transaction-based data exchange for an information management system, said on demand sharing comprising:

creating a transaction containing unique customer identification, requested service type, and service parameters;

sending said transaction to at least one main server;

querying said at least one main server about processing capacity associated with said at least one main server to help ensure availability of adequate resources for processing of said transaction; and allocating additional processing capacity when additional capacity appears needed to process said transaction, said additional processing capacity being selected from the group of additional capacities consisting of central processing unit capacity, processor memory capacity, network bandwidth capacity, and storage capacity.

38. The storage medium of claim 37, further comprising instructions for causing the computer to implement recording a plurality of usage measurements selected from the group of usage measurements consisting of network bandwidth, processor memory, storage, and central processing unit cycles.

39. The storage medium of claim 38, further comprising instructions for causing the computer to implement:

summing said usage measurements;

acquiring at least one multiplicative value associated with said usage measurements and with unit costs; and recording any such acquired multiplicative value as an on demand charge to a requesting customer.

40. The storage medium of claim 39, further comprising instructions for causing the computer to implement at least one of:

posting said on demand charge on a web site if requested by said requesting customer; and sending said on demand charge via e-mail to said requesting customer's e-mail address.

41. The storage medium of claim 39, further comprising instructions for causing the computer to implement charging said on demand charge to said requesting customer's account if an account exists and if said requesting customer has selected a charge account payment method.

42. The storage medium of claim 24, further comprising instructions for causing the computer to implement deploying, accessing, and executing process software for implementing said transaction-based data exchange for an information management system, said deploying, accessing, and executing process software implemented through a virtual private network, the method further comprising:

determining if a virtual private network is required;

checking for remote access to said virtual private network when it is required;

if said remote access does not exist, identifying a third party provider to provide secure, encrypted connections between a private network and remote users;

identifying said remote users; and setting up a network access server operable for downloading and installing client software on desktop computers for remote access of said virtual private network;

accessing said process software;

transporting said process software to at least one remote user's desktop computer; and executing said process software on said at least one remote user's desktop computer.

43. The storage medium of claim 42, further comprising instructions for causing the computer to implement:

determining if said virtual private network has a site-to-site configuration for providing site-to-site access, and if said virtual private network is not so available, installing equipment required to establish a site-to-site configuration for said virtual private network;

installing large scale encryption into said site-to-site virtual private network; and accessing said process software through said site-to-site configuration with large scale encryption.

44. The storage medium of claim 43, wherein said accessing said process software further comprises at least one of:

dialing into said network access server, and attaching directly via a modem into said network access server, said modem being selected from the group of modems consisting of telephone dial-up modems, cable modems, DSL modems, and wireless modems.

45. A system for implementing transaction-based data exchange, comprising:

a processor configured to execute a data exchange system application; and at least one client system, the at least one client system connected to the data exchange system over a network, the data exchange system application performing a method comprising:

transferring, via a data exchange system application executing on at least one of the computer processors, information relating to a product that is transferred via a transmission means selected by an individual using one of the computer processors, the individual requesting the information, the information including warranty information, accounting depreciation instructions, pricing information, and product details;

acquiring accounting instructions, the accounting instructions originating from government regulation and based on a geographic location of the individual, the acquiring based on at least one of:

automatically identifying the geographic location of the individual; and evaluating existing accounting information, the existing accounting information stored on a client system of the individual and accessible by the data exchange system;

calculating, by the one or more computer processors, a current net worth of the product, the current net worth determined using:

product information supplied at time of purchase, the product information including:
product specifications;
product identification information;
warranty information;
promotions;
discounts;
preferred customer pricing; and
service information; and the accounting instructions in combination with elapsed time since date of purchase, the accounting instructions comprising the accounting instructions;

comparing, by the data exchange system application, results of the calculating with historical accounting information, the historical accounting information including factors that are determined to impact the current net worth, the factors including at least one of:
depreciation due to market place factors; and
changes in technology related to the product;

adjusting, by the data exchange system application, the results of the calculating based on the comparing; and updating, via the selected transmission means, a financial application of the computer processor associated with the individual, the financial application updated with the adjusted results of the calculating;

providing results of the updating to the individual.

46. The system of claim 45, wherein the data exchange system application further performs acquiring the information relating to a product from at least one of:
a selling entity;
a manufacturing entity; and
a product catalog.

47. The system of claim 45, wherein the warranty information includes at least one of:
terms and conditions;
warranty period; and
product identification.

48. The system of claim 45, wherein the accounting rules include at least one of:
depreciation rules; and
tax rules.

49. The system of claim 45, wherein the pricing information includes at least one of:
retail price;
price after discount;
price after rebate;
promotional price; and
preferred customer price.

50. The system of claim 45, wherein the product details include at least one of:
product specifications;
product model; and
product images.

51. The system of claim 45, wherein the information is requested by the individual at a physical point of sale.

* * * * *